United States Patent [19]

Berkheimer

[11] Patent Number: 5,216,499
[45] Date of Patent: Jun. 1, 1993

[54] CABLE SELECT BOX SUPPLEMENTAL SIGNAL SPLITTING APPARATUS

[75] Inventor: John R. Berkheimer, Tempe, Ariz.

[73] Assignee: Go-Video, Inc., Scottsdale, Ariz.

[21] Appl. No.: 709,606

[22] Filed: May 31, 1991

[51] Int. Cl.⁵ .......................... H04N 1/00; H04N 7/10
[52] U.S. Cl. ........................ 358/86; 455/4.2; 455/6.2; 455/6.3
[58] Field of Search ............ 358/86, 181; 455/3, 455/6, 4.2, 3.1, 3.2, 6.1, 6.2, 6.3

[56] References Cited

U.S. PATENT DOCUMENTS

| | | | |
|---|---|---|---|
| 4,272,791 | 6/1981 | Rifken | 358/86 |
| 4,276,562 | 6/1981 | Stewart et al. | 358/181 |
| 4,316,217 | 2/1982 | Rifken | 455/3 |
| 4,717,970 | 1/1988 | Long | 358/86 |
| 4,783,846 | 11/1988 | Wachob | 358/181 |
| 4,847,700 | 6/1989 | Freeman | 358/86 |
| 4,977,455 | 12/1990 | Young | 358/86 |
| 4,996,597 | 2/1991 | Duffield | 358/181 |

Primary Examiner—Reinhard J. Eisenzopf
Assistant Examiner—Timothy H. Keough
Attorney, Agent, or Firm—Donald A. Streck

[57] ABSTRACT

This is a supplemental signal splitting apparatus for use with television apparatus having a cable signal input including scrambled signal channels; a cable select box including a cable tuner for selecting a channel, descrambling circuitry for unscrambling scrambled signals, and first output circuitry for outputting a first signal on a television channel frequency; and a programmable video cassette recorder (VCR) including a VCR tuner for selecting a channel, an antenna input to the VCR tuner, an audio/video input, programmable selection means for selectively receiving an input signal from the VCR tuner or the audio/video input, and second output circuitry for outputting a second signal on a television channel frequency. The supplemental signal splitting apparatus allows the VCR to be programmed to record both an unscrambled pay channel and normal cable channels. There is input circuitry for receiving the cable signal input and for outputting a first and a second copy of television signals contained in the cable signal input, first connecting circuitry for connecting the first copy of television signals contained in the cable signal input to the cable tuner; and, second connecting circuitry for connecting audio and video signals contained in the second copy of television signals contained in the cable signal input to the audio/video input of the VCR.

12 Claims, 2 Drawing Sheets

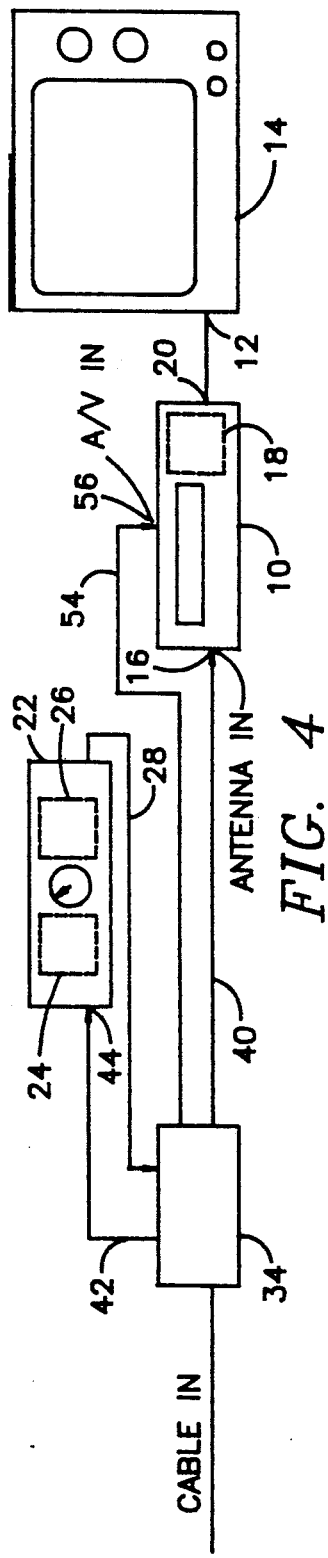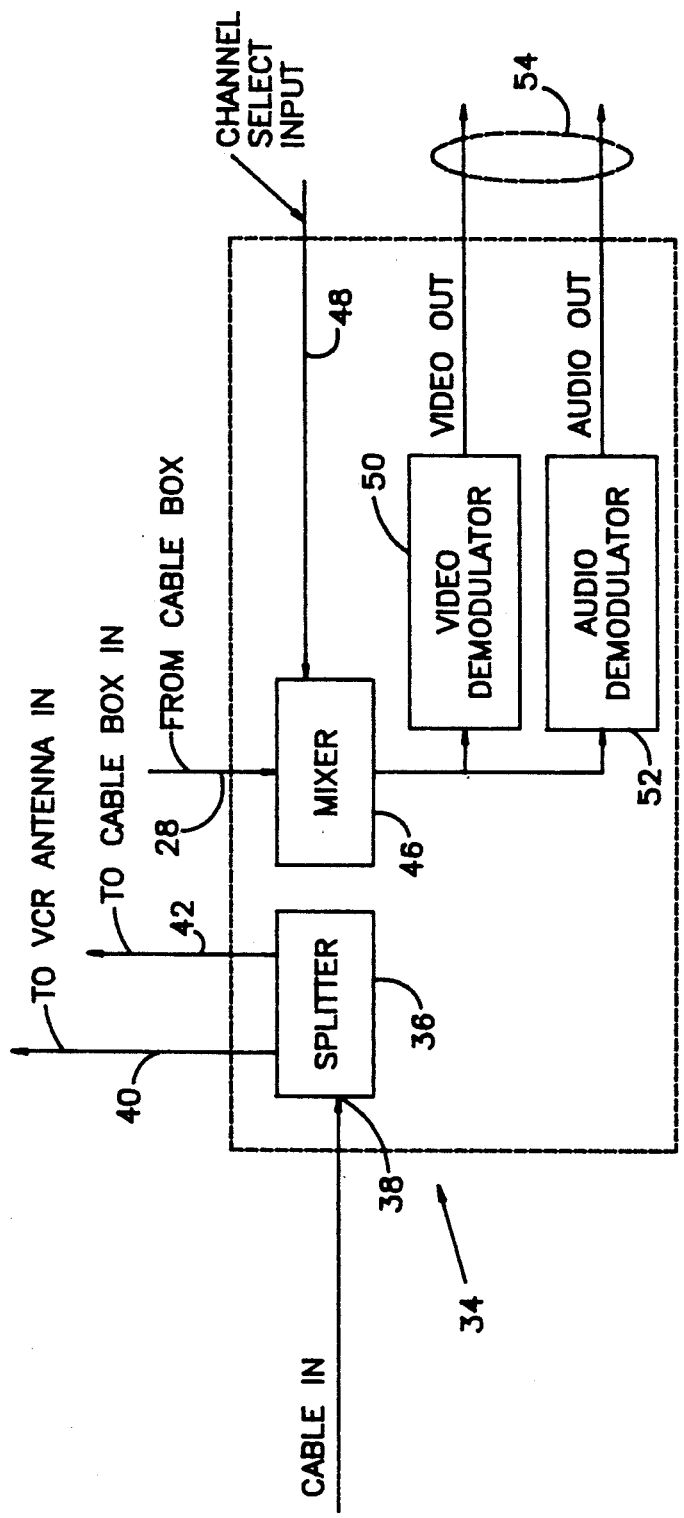
FIG. 4
FIG. 5

CABLE SELECT BOX SUPPLEMENTAL SIGNAL SPLITTING APPARATUS

BACKGROUND OF THE INVENTION

This invention relates to television signal routing and processing apparatus and, more particularly, to supplemental signal splitting apparatus for use with television apparatus having a cable signal input including scrambled signal channels; a cable select box including a cable tuner for selecting a channel, descrambling circuitry for unscrambling scrambled signals, and first output circuitry for outputting a first signal on a television channel frequency; and a programmable video cassette recorder (VCR) including a VCR tuner for selecting a channel, an antenna input to the VCR tuner, an audio/video input, programmable selection means for selectively receiving an input signal from the VCR tuner or the audio/video input, and second output circuitry for outputting a second signal on a television channel frequency. The apparatus comprising, means for receiving the cable signal input and for outputting a first and a second copy of television signals contained in the cable signal input; first means for connecting the first copy of television signals contained in the cable signal input to the cable tuner; and, second means for connecting audio and video signals contained in the second copy of television signals contained in the cable signal input to the audio/video input of the VCR.

In its most basic configuration, a video cassette recorder (VCR) 10 is connected to the antenna input 12 of a television set 14. The VCR 10 has a signal input 16 which can be connected to a wire or co-axial cable connected to an antenna or other signal source. Most contemporary VCRs include a "cable-ready" tuner 18 so that a video cable service input can be connected directly to the input 16 and the cable select box can be eliminated from the installation. In such case, channel selections for viewing and/or recording are made with the tuner 18 of the VCR 10. The VCR 10 outputs an RF signal at 20 which is connected to the antenna input 12 of the television set 14. Typically, the signal at 20 is on a channel such as 3 or 4 and the tuner of the television set 14 is left on that channel.

When the user purchases a "pay" channel as part of the cable service, the simplified installation of FIG. 1 is no longer possible and a cable select box 22 must be employed. The cable select box 22 includes both a tuner 24 and a "descrambler" 26. The tuner 24 is basically the same as the tuner 18 of the VCR 10. It is the descrambler 26 that is required in order to be able to receive the pay channels. To this end, an installation such as shown in FIG. 2 can be employed. The cable signal is input to the cable select box 22 which, like the VCR 10, outputs an RF signal at 28 on a standard channel such as 3 or 4. In use, therefore, both the VCR 10 and the television set 14 have their tuners set to the fixed transmitting channel and all channel selections by the user are done through the cable select box 22.

The configuration of FIG. 2 has a serious limitation—it severely limits the use of the VCR for recording broadcast television, i.e. "time-shifting" recording. The tuner 18 of the VCR 10 must remain on the channel out of the cable select box 22; so, all that can be programmed into the VCR 10 for recording purposes is a start time and a stop time. The channel to be recorded must be pre-set in the tuner 24 of the cable select box 22. Thus, all the multi-channel and multi-recording time programming features included in a typical VCR are simply wasted as the VCR 10 no longer has any control over the channel selection.

Attempts to get around the foregoing problem have been made in the prior art such as that depicted in FIG. 3. As can be seen, a signal splitter 30 and an A/B switch 32 have been added so that the user can manually select whether the VCR 10 or the cable select box 22 is in control of the channel selection. As those skilled in the art will readily recognize and appreciate, the installation configuration of FIG. 3 restores programming flexibility to the VCR 10 for non-pay channel use; but, once the cable select box 22 has been switched on as the active input in order to get pay signals de-scrambled, the FIG. 3 system is essentially the FIG. 2 system once again. More complex splitting and switching systems are also to be found in the prior art; but, they only add to the complexity of use and do not solve the foregoing problem.

Wherefore, it is the object of this invention to provide a way in which to combine a pay channel input descrambled by a cable select box with VCR control of programming functions for improved flexibility of use over the above-described prior art approaches.

Other objects and benefits of the invention will become apparent from the detailed description which follows hereinafter when taken in conjunction with the drawing figures which accompany it.

SUMMARY

The foregoing object has been achieved in television apparatus having a cable signal input including scrambled signal channels; a cable select box including a cable tuner for selecting a channel, descrambling circuitry for unscrambling scrambled signals, and first output circuitry for outputting a first signal on a television channel frequency; and a programmable video cassette recorder (VCR) including a VCR tuner for selecting a channel, an antenna input to the VCR tuner, an audio/video input, programmable selection means for selectively receiving an input signal from the VCR tuner or the audio/video input, and second output circuitry for outputting a second signal on a television channel frequency, by the supplemental signal splitting apparatus of the present invention comprising, means for receiving the cable signal input and for outputting a first and a second copy of television signals contained in the cable signal input; first means for connecting the first copy of television signals contained in the cable signal input to the cable tuner; and, second means for connecting audio and video signals contained in the second copy of television signals contained in the cable signal input to the audio/video input of the VCR.

In the preferred embodiment, the supplemental signal splitting apparatus further comprises, signal splitter means for receiving the cable signal input and for outputting a first and a second copy of television signals received by the signal splitter means; first connecting means for connecting teh first copy of television signals received by the signal splitter means to the cable tuner; mixer means for receiving the first signal from the first output circuitry and for outputting a signal on a standard internal channel frequency; demodulator means for receiving the signal from the mixer means and for demodulating and outputting audio/video signals therefrom; second connecting means for connecting the audio/video signals from the demodulator means to the audio/video input of the VCR; and, third connecting means for connecting the second copy of television signals received by the signal splitter means to the antenna input of the VCR.

The preferred demodulator means includes video demodulator means for receiving the signal from the mixer means, for demodulating a video signal therefrom, and for outputting the video signal; and, audio demodulator means for receiving the signal from the mixer means, for demodulating an audio signal therefrom, and for outputting the audio signal.

The preferred mixer means includes channel select means for a user to indicate a channel frequency being output by the cable select box; and, means for shifting the first signal from the first output circuitry at the channel frequency being output by the cable select box to the standard internal channel frequency.

DESCRIPTION OF THE DRAWINGS

FIG. 4 is a simplified block diagram of the manner in which the present invention is employed to connecting a cable select box and a video cassette recorder to a television set.

FIG. 5 is a functional block diagram of the supplemental signal splitting apparatus of the present invention as employed in FIG. 4.

DESCRIPTION OF THE PREFERRED EMBODIMENT

Figure 1:
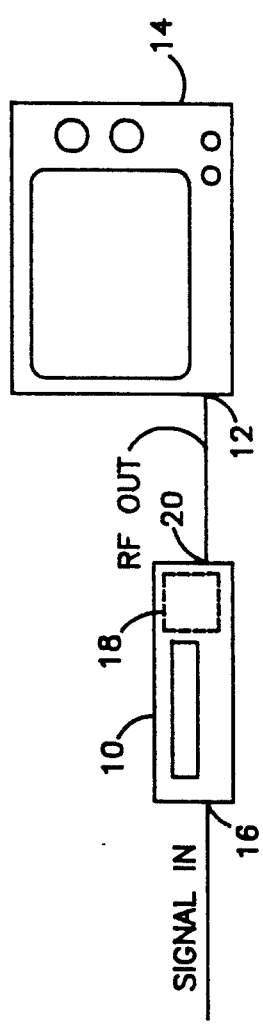
FIG. 1 is a simplified block diagram of a prior art approach to connecting a video cassette recorder to a television set.
Figure 2:
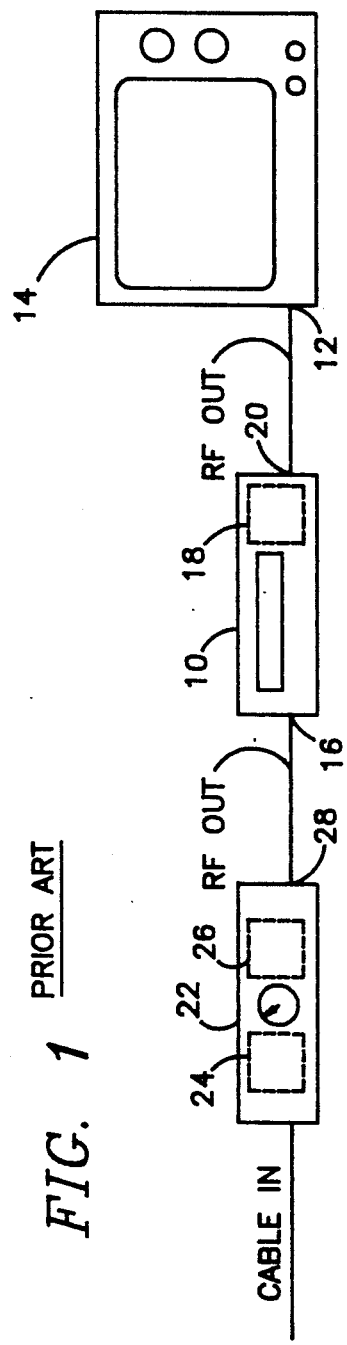
FIG. 2 is a simplified block diagram of a prior art approach to connecting a cable select box to a television set through a video cassette recorder.
Figure 3:
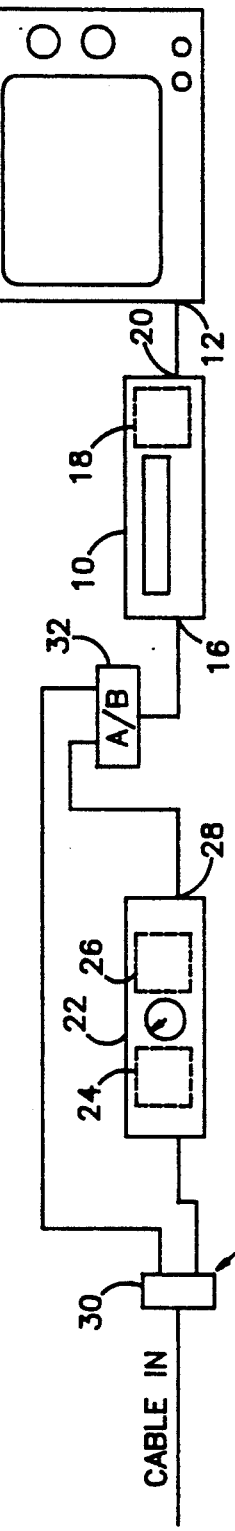
FIG. 3 is a simplified block diagram of an alternate prior art approach to connecting a cable select box to a television set through a video cassette recorder employing signal splitters and A/B switches.

The object of the present invention is achieved by the addition of the supplemental signal splitting apparatus (SSSA) 34 of FIG. 4 which is shown in greater detail in FIG. 5. The SSSA 34 has a signal splitter 36 which receives the cable input at 38 and outputs the signal from the cable at outputs 40 and 42. One output 40 is connected to the antenna input 12 of the VCR 10. The other output 42 is connected to the cable input 44 of the cable select box 22. The SSSA 34 also includes a mixer 46 which is connected to receive the RF output 28 of the cable select box 22. The channel being employed by the cable select box 22 for its output signal is designated by the user through the input 48, which can be of any well-known approach such as a slide switch (select channel 3/4) or DIP switches. The mixer 46 shifts the RF signal output from the cable select box 22 to a standard internal channel and outputs the signal to a video demodulator 50 and an audio demodulator 52 which strip the video and audio signals, respectively, from the RF signal and output them at 54. The video and audio signals at 54 are connected to the audio/video signal input 56 which is included in most newer VCRs.

Thus, as those skilled in the art will readily recognize and appreciate, the VCR 10 is now provided with two inputs. One, connected to the antenna input 12, contains all the cable channels in their unscrambled state. The second, connected to the audio/video signal input 56, contains the signal information for the channel presently selected by the cable select box 22, which can be a scrambled channel. If the VCR 10 is of the type which allows its signal input to be selectively programmed to be from either the audio/video signal input 56 or the antenna input 12, the user can program a mix of recording requests which includes both the non-scrambled cable channels appearing at the antenna input 12 and one scrambled pay channel appearing at the audio/video signal input 56. While those skilled in the art will readily recognize that more than one pay channel cannot be pre-programmed employing the present invention, they will also recognize that this is not a serious limitation to most users as compared with the ability provided by the present invention to be able to employ most of the programming functions of a modern VCR in combination with a scrambled pay channel—which was not possible employing any of the prior art approaches and apparatus.

Wherefore, having thus described the present invention,

What is claimed is:

1. In television apparatus having a cable signal input containing unscrambled and scrambled cable signal frequency channels; a cable select box including means for receiving said cable signal input and a cable tuner for selecting a cable signal frequency channel, descrambling circuitry for unscrambling said scrambled cable signal frequency channels, and first output circuitry for outputting a first signal on a predesignated television channel frequency, said first signal comprising the cable signal frequency channel selected on said cable tuner and being one of (i) an originally unscrambled cable signal frequency channel and (ii) a scrambled cable signal frequency channel unscrambled by said descrambling circuitry; and a programmable video cassette recorder (VCR) including a VCR tuner for selecting a cable signal frequency channel, an antenna input to the VCR tuner, separate audio and video inputs, programmable selection means for selectively receiving an input signal from the VCR tuner or the audio and video inputs, and second output circuitry for outputting a second signal on a predesignated television channel frequency, said second signal being one of (i) the output of the VCR tuner and (ii) said audio and video inputs, the improvement comprising:

a) signal splitter means for receiving said cable signal input and for outputting a first and a second copy of said cable signal input received by said signal splitter means;

b) first connecting means for connecting said first copy of said cable signal input received by said signal splitter means to said cable select box;

c) mixer means for receiving said first signal from said first output circuitry of said cable select box and for outputting a third signal on a predetermined internal channel frequency;

d) demodulator means for receiving said third signal from said mixer means and for demodulating and outputting an audio signal and a video signal therefrom, said audio and video signals being separate from one another;

e) second connecting means for connecting said separate audio and video signals from said demodulator means to said separate audio and video inputs of the VCR; and, f) third connection means for connecting said second copy of said cable signal input received by said signal splitter means to said antenna input of said VCR.

2. The improvement to television apparatus of claim 1 wherein said demodulator means includes:
a) video demodulator means for receiving said signal from said mixer means, for demodulating a video signal therefrom, and for separately outputting said video signal; and,
b) audio demodulator means for receiving said signal from said mixer means, for demodulating an audio signal therefrom, and for separately outputting said audio signal.

3. The improvement to television apparatus of claim 1 wherein said mixer means includes:
a) user-controlled channel select means for selecting a frequency corresponding to said predesignated television channel frequency of said first signal being output by the cable select box and input to said mixer; and,
b) means for shifting the first signal from the first output circuitry at the channel frequency being output by the cable select box to said predetermined internal channel frequency.

4. In television apparatus having a cable signal input containing unscrambled and scrambled television signal frequency channels; a cable select box including means for receiving said television signal frequency channels and a cable tuner for selecting a television signal frequency channel, descrambling circuitry for unscrambling said scrambled television signal frequency channels, and first output circuitry for outputting a first signal on a predesignated television channel frequency, said first signal comprising the television signal frequency channel selected on said cable tuner and being one of (i) an originally unscrambled television signal frequency channel and (ii) a scrambled television signal frequency channel unscrambled by said descrambling circuitry; and a programmable video cassette recorder (VCR) including a VCR tuner for selecting a television channel frequency channel, an antenna input to the VCR tuner, separate audio and video inputs, programmable selection means for selectively receiving an input signal from the VCR tuner or the audio and video inputs, and second output circuitry for outputting a second signal on a predesignated television channel frequency, said second signal being one of (i) the output of the VCR tuner and (ii) said audio and video inputs, a supplemental signal splitting apparatus comprising:
a) means for receiving said cable signal input and for outputting a first and a second copy of said television signal frequency channels contained in the cable signal input;
b) first means for connecting said first copy of said television signal frequency channels contained in the cable signal input to the cable select box;
c) means for receiving said first signal from said first output circuitry of the cable select box;
d) separating means, connected to said means for receiving, for separating an audio component signal and a video component signal from said first signal;
e) second means for connecting said separated audio and video component signals to the said separate audio and video inputs of the VCR, respectively; and
f) third connecting means for exclusively connecting said second copy of said television signal frequency channels received by said signal splitting apparatus to the antenna input of the VCR.

5. The improvement to television apparatus of claim 4 wherein the separating means comprises:
a) mixer means for receiving said first signal from said receiving means and for outputting a third signal on a predetermined internal channel frequency;
b) demodulator means for receiving said third signal from said mixer means and for demodulating and outputting said separate audio and video component signals therefrom.

6. The improvement to television apparatus of claim 5 wherein said demodulator means includes:
a) video demodulator means for receiving said signal from said mixer means, for demodulating a video signal therefrom, and for separately outputting said video signal; and,
b) audio demodulator means for receiving said signal from said mixer means, for demodulating an audio signal therefrom, and for separately outputting said audio signal.

7. The improvement to television apparatus of claim 5 wherein said mixer means includes:
a) user-controlled channel select means for selecting a frequency corresponding to said predesignated television channel frequency of said first signal being output by the cable select box and input to said mixer; and,
b) means for shifting the first signal from the first output circuitry at the channel frequency being output by the cable select box to said predetermined internal channel frequency.

8. A supplemental signal splitting apparatus for use with television apparatus having a cable signal input containing unscrambled and scrambled television signal frequency channels; a cable select box including means for receiving said television signal frequency channels and a cable tuner for selecting a television signal frequency channel, descrambling circuitry for unscrambling said scrambled television signal frequency channels, and first output circuitry for outputting a first signal on a predesignated television channel frequency, said first signal comprising the television signal frequency channel selected on said cable tuner and being one of (i) an originally unscrambled television signal frequency channel and (ii) a scrambled television signal frequency channel unscrambled by said descrambling circuitry; and a programmable video cassette recorder (VCR) including a VCR tuner for selecting a television channel frequency channel, an antenna input to the VCR tuner, separate audio and video inputs, programmable selection means for selectively receiving an input signal from the VCR tuner or the audio and video inputs, and second output circuitry for outputting a second signal on a predesignated television channel frequency, said second signal being one of (i) the output of the VCR tuner and (ii) said audio and video inputs, comprising:
a) means for receiving said cable signal input and for outputting a first and a second copy of said television signal frequency channels contained in the cable signal input;
b) first means for connecting said first copy of said television signal frequency channels contained in the cable signal input to the cable select box;
c) means for receiving said first signal from said first output circuitry of the cable select box;
d) separating means, connected to said means for receiving, for separating an audio component signal and a video component signal from said first signal;

e) second means for connecting said separated audio and video component signals to the said separate audio and video inputs of the VCR, respectively; and f) third connecting means for exclusively connecting said second copy of said television signal frequency channels received by said signal splitting apparatus to the antenna input of the VCR.

9. The supplemental signal splitting apparatus of claim 8 wherein the separation means comprises:

a) mixer means for receiving said first signal from said receiving means and for outputting a third signal on a predetermined internal channel frequency;

b) demodulator means for receiving said third signal from said mixer means and for demodulating and outputting said separate audio and video component signals therefrom;

10. The supplemental signal splitting apparatus of claim 9 wherein said demodulator means includes:

a) video demodulator means for receiving said signal from said mixer means, for demodulating a video signal therefrom, and for separately outputting said video signal; and, b) audio demodulator means for receiving said signal from said mixer means, for demodulating an audio signal therefrom, and for separately outputting said audio signal.

11. The supplemental signal splitting apparatus of claim 9 wherein said mixer means includes:

a) user-controlled channel select means, for selecting a frequency corresponding to said predesignated television channel frequency of said first signal being output by the cable select box and input to said mixer; and, b) means for shifting the first signal from the first output circuitry at the channel frequency being output by the cable select box to said predetermined internal channel frequency.

12. A supplemental signal splitting apparatus for use with television apparatus having a cable signal input containing unscrambled and scrambled cable signal frequency channels; a cable select box including means for receiving said cable signal input and a cable tuner for selecting a cable signal frequency channel, descrambling circuitry for unscrambling said scrambled cable signal frequency channels, and first output circuitry for outputting a first signal on a predesignated television channel frequency, said first signal comprising the cable signal frequency channel selected on said cable tuner and being one of (i) an originally unscrambled cable signal frequency channel and (ii) a scrambled cable signal frequency channel unscrambled by said descrambling circuitry; and a programmable video cassette recorder (VCR) including a VCR tuner for selecting a cable signal frequency channel, an antenna input to the VCR tuner, separate audio and video inputs, programmable selection means for selectively receiving an input signal from the VCR tuner or the audio and video inputs, and second output circuitry for outputting a second signal on a predesignated television channel frequency, said second signal being one of (i) the output of the VCR tuner and (ii) said audio and video inputs, comprising:

a) signal splitter means for receiving said cable signal input and for outputting a first and a second copy of said cable signal input received by said signal splitter means;

b) first connecting means for connecting said first copy of said cable signal input received by said signal splitter means to said cable select box;

c) mixer means for receiving said first signal from said first output circuitry of said cable select box and for outputting a third signal on a predetermined internal channel frequency, said mixer means including, c1) user-controlled channel select means, for selecting a frequency corresponding to said predesignated television channel frequency of said first signal being output by the cable select box and input to said mixer, and c2) means for shifting the first signal from the first output circuitry at the channel frequency being output by the cable select box to said predetermined internal channel frequency;

d) demodulator means for receiving said third signal from said mixer means and for demodulating and outputting an audio signal and a video signal therefrom, said audio and video signals being separate from one another, said demodulator means including, d1) video demodulator means for receiving said signal from said mixer means, for demodulating a video signal therefrom, and for separately outputting said video signal, and d2) audio demodulator means for receiving said signal from said mixer means, for demodulating an audio signal therefrom, and for separately outputting said audio signal;

e) second connecting means for connecting said separate audio and video signals from said demodulator means to said separate audio and video inputs of the VCR; and, f) third connection means for connecting said second copy of said cable signal input received by said signal splitter means to said antenna input of said VCR.

* * * * *